United States Patent [19]

Yamashita et al.

[11] 4,368,293

[45] Jan. 11, 1983

[54] POLYPHENYLENE ETHER COMPOSITIONS

[75] Inventors: Izumi Yamashita, Chiba; Kunio Fukuda, Chigasaki, both of Japan

[73] Assignee: Asahi-Dow Limited, Tokyo, Japan

[21] Appl. No.: 298,808

[22] Filed: Sep. 2, 1981

[30] Foreign Application Priority Data

Sep. 9, 1980 [JP]  Japan .................. 55-124017

[51] Int. Cl.³ ................. C08L 51/08; C08L 61/04
[52] U.S. Cl. ........................ 525/68; 525/63; 525/392; 525/905
[58] Field of Search ............ 525/68, 905, 392, 63

[56] References Cited

U.S. PATENT DOCUMENTS 4,128,604  5/1978  Katchman et al. .......... 525/133

Primary Examiner—J. Ziegler
Attorney, Agent, or Firm—Armstrong, Nikaido, Marmelstein & Kubovcik

[57] ABSTRACT

A polyphenylene ether composition excellent in impact resistance, heat stability, gloss and processability which contains (a) 80–20 weight parts of polyphenylene ether resin, and
(b) 20–80 weight parts of a rubber-reinforced polystyrene wherein 5–25 weight % of polybutadiene having 15–35% of 1,2-vinyl-structure is dispersed forming discontinuous elastomer phase, particularly said polyphenylene ether resin being a polymer having the following recurring unit I or units I and II:

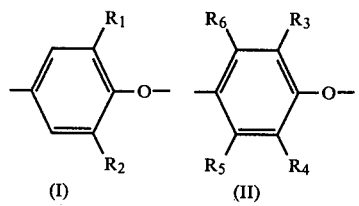

(I)  (II)

wherein $R_1$–$R_6$ represent the same or different monovalent residual groups such as alkyl group having 1–4 carbon atoms excluding tert.-butyl group, aryl group, halogen or hydrogen, but $R_5$ and $R_6$ are not hydrogens at the same time.

6 Claims, No Drawings

POLYPHENYLENE ETHER COMPOSITIONS

The present invention relates to polyphenylene ether compositions excellent in impact resistance, heat stability, gloss and processability.

Polyphenylene ether is a resin which recently attracts much attention since it is excellent in mechanical properties, electrical characteristics and heat resistance and, in addition, it has nice properties such as low water absorption and high dimensional stability. However, when polyphenylene ether is used alone, the industrial application thereof is remarkably limited generally because of low processability and low impact strength. In order to make up these defects, there is disclosed a technology to blend polyphenylene ether with a styrene polymer or a rubber-reinforced polystyrene in Japanese published examined patent application No. 17812/1968, U.S. Pat. No. 3,383,435 and so on. As the reinforcing rubber in this case, it is a current tendency to use, as described in U.S. Pat. No. 4,128,604 a polybutadiene comprising 35% of 1,4-cis-structure, 55% of 1,4-trans-structure and 10% of 1,2-vinyl-structure. The reinforcement effect is much dependent upon the amount of rubber added. That is, in order to obtain higher impact resistance, the rubber content in the composition may be increased; however, though the impact resistance is increased, the gloss and processability is, on the contrary, decreased. Consequently, in order to improve the impact resistance without increasing the rubber content, it is proposed in U.S. Pat. No. 4,128,604 to use a polybutadiene having 1,4-cis-structure as the rubber. Though such a composition certainly shows an excellent impact resistance, it has so poor stability to oxidation that the physical property of the composition is remarkably lowered when exposed to high temperatures for a long time.

The present inventors took these situations into consideration and succeeded in obtaining polyphenylene ether compositions excellent in impact resistance, heat stability, gloss and processability, on the basis of the finding that the 1,2-vinyl structure of the poly-butadiene used as the reinforcing rubber unexpectedly has a close relation to the impact strength of the composition obtained.

Furthermore, the composition of the present invention can give an injection molded shaped articles short weld lines which are thin lines generated at joined parts when the molten resin flows and branches away in a mold in an injection molding. No relation between weld lines and the kind of rubber was known heretofore. Of course short weld line is desirable for the appearance of a product. It is known that the welded part has much inferior mechanical strength to that of other parts. Also in this meaning, a short weld line is quite significant to raise up the practical strength of the product.

In the accompanying drawing, a flat plate for the evaluation of a weld line is shown. Practically, weld line is often a problem of, for example, a housing of electrical articles from appearance and strength.

The present invention relates to polyphenylene ether compositions which comprises polyphenylene ether resin and a rubber-reinforced polystyrene wherein 5–25 weight % of polybutadiene having 15–35% of 1,2-vinyl-structure are dispersed forming a discontinuous elastomer phase.

The polyphenylene ether resin mentioned in the present invention is a polymer having the following recurring unit I or units I and II;

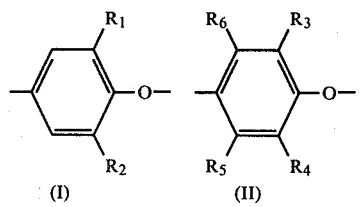

wherein $R_1$–$R_6$ represent the same or different monovalent residual groups such as alkyl group having 1–4 carbon atoms excluding tert.-butyl group, aryl group, halogen or hydrogen but $R_5$ and $R_6$ are not hydrogens at the same time. It has been widely known that the polyphenylene ether resin can be, for instance, obtained by the reaction of the raw material phenyl with oxygen in the presence of copper or manganese complex. As concrete examples of them, there can be illustrated
poly(2,6-dimethyl-1,4-phenylene)ether,
poly(2,6-diethyl-1,4-phenylene)ether,
poly(2,6-dichloro-1,4-phenylene)ether,
poly(2,6-dibromo-1,4-phenylene)ether,
poly(2-methyl-6-ethyl-1,4-phenylene)ether,
poly(2-chloro-6-methyl-1,4-phenylene)ether,
poly(2-methyl-6-isopropyl-1,4-phenylene)ether,
poly(2,6-di-n-propyl-1,4-phenylene)ether,
poly(2-chloro-6-bromo-1,4-phenylene)ether,
poly(2-chloro-6-ethyl-1,4-phenylene)ether,
poly(2-methyl-1,4-phenylene)ether,
poly(2-chloro-1,4-phenylene)ether,
poly(2-phenyl-1,4-phenylene)ether,
poly(2-methyl-6-phenyl-1,4-phenylene)ether,
poly(2-bromo-6-phenyl-1,4-phenylene)ether, a copolymer of 2,6-dimethyl phenol and 2,3,6-trimethyl phenol and the like.

In addition, there may be used polymers obtained by graft-copolymerization of styrene alone or a monomer copolymerizable with styrene to said polyphenylene ether. As monomers copolymerizable with styrene, there can be, for example, used α-methylstyrene, methylstyrene, dimethylstyrene, vinyltoluene, acrylonitrile, methacrylonitrile, acrylic acid, methacrylic acid and esters of methacrylic acid. There is no particular limitation on the method to carry out graft-copolymerization of one of these monomers to polyphenylene ether. However, there can be used a method proposed in, for example, Japanese published examined patent application No. 30991/1977 and U.S. Pat. Nos. 3,929,930 and 4,097,556, etc.; that is, a method wherein the graft-copolymerization of styrene alone or one of said monomers to polyphenylene ether is carried out by heating in the presence of a peroxide.

The rubber-reinforced polystyrene mentioned in the present invention can be industrially produced by dissolving 5–25 weight parts of polybutadiene in 95–75 weight parts of styrene and polymerizing said solution at 20°–250° C. in the presence of a radical polymerization initiator or in the absence of any catalyst according to bulk polymerization or combined bulk/suspension polymerization. As radical polymerization initiators, azo initiators such as α,α'-azobisisobutyronitrile, 2,2'-azobis-2,4-dimethylvaleronitrile and azobiscyclohexanenitrile and organic peroxides such as di-tert.-butyl peroxide, dicumyl peroxide, tert.-butylcumyl peroxide, 2,5-dimethyl-2,5-di(tert.-butylperoxy)hexyne, 1,1-di-tert.-butylperoxy-3,3,5-trimethylcyclohexane, benzoyl peroxide, 2,5-dimethyl-2,5-di(tert.-butylperoxy)hexane, tert.-butylperoxybenzoate, tert.-butylhydroperoxide and cumene hydroperoxide can be used alone or in combination.

The polybutadiene used in the present invention has to be one whose 1,2-vinyl-structure is in the range of 15–35%, preferably 18–30%. A polybutadiene having such a structure that the 1,2-vinyl-structure is out of this range is not desirable because of the poor Izod impact strength in the composition. As the method to produce the polybutadiene having such a particular structure, any known one up to now may be used as far as said structure can be obtained. For instance, in Japanese published examined patent application No. 15386/1961, there is illustrated a method wherein, in a solution polymerization in the presence of an organolithium compound, one of polar compounds, for example, ethers such as dimethyl ether, diethyl ether and tetrahydrofuran, thioethers such as dimethyl sulfide and diethyl sulfide and amines such as dimethylethylamine and tri-n-propylamine is added to the polymerization system. Further, a method wherein hexamethylphosphoramide (HMPA) is added to the polymerization system is disclosed in Japanese published examined patent application No. 5904/1968.

1,2-vinyl-structure may be uniformly distributed in the molecular chain or may gradually vary in the direction of molecular chain as disclosed in Japanese published examined patent application No. 875/1973 or may be bonded blockwise as disclosed in U.S. Pat. No. 3,301,840 as far as the total content thereof is in the range of 15–35%.

When the polybutadiene content in the rubber-reinforced polystyrene is not higher than 5 weight %, only poor reinforcement effect can be obtained. However, when said content is not lower than 25 weight %, the viscosity of the solution prepared by dissolving rubber in styrene is remarkably increased resulting in difficulty in industrial production. Consequently, it is desirable that the polybutadiene content is in the range of 5–25 weight %.

In the composition of the present invention, when the content of the polyphenylene resin is not lower than 80 weight parts, it is not suitable to many applications because of poor processability; however, a content thereof not higher than 20 weight parts is not desirable for practical uses because the heat resistance which is a feature of polyphenylene ether is remarkably decreased, either. Consequently, it is desirable for practical uses that the content of polyphenylene ether resin is in the range of 80–20 weight parts and that of the rubber-reinforced polystyrene is in the range of 20–80 weight parts.

Any method can be used to blend the components in order to form the composition of the present invention. For example, extruder, heating rolls, Bumbury's mixer or kneader can be used.

It is also possible to add other additives known up to now, for example, plasticizer, colorant, flame retarder, stabilizer, mold-releasing agent, fibrous reinforcing agent such as glass fiber or carbon fiber, filler such as glass beads, calcium carbonate or talc to the composition of the present invention.

As plasticizers are particularly effective polybutene, low molecular weight polyethylene, mineral oil, epoxidized soybean oil, polyethylene glycol and esters of fatty acids. As a flame retarder, aromatic phosphates are particularly effective. Also other polymers such as, for example, polyethylene, ethylene-propylene copolymer, styrene-butadiene block copolymer and polyesters can be blended with the composition as far as the characteristics such as mechanical strength are not degraded.

The present invention will be explained with examples hereinbelow, however, the present invention is never limited by them.

Impact resistance is represented as Izod impact strength measured in accordance with ASTM-D-256.

Tensile strength was measured in accordance with the test method of ASTM-D-638.

Heat resistance is represented as heat distortion temperature measured in accordance with JIS-K7207.

Processability is represented as melt flow rate measured at 250° C. under the load of 10 kg/cm$^2$.

Gloss was measured at a position 4 cm apart from the end of the gate side of a dumbbell-shaped test piece in accordance with the test method of ASTM-D-523.

Stability of oxidation was evaluated on the basis of the decrease of impact strength after the exposure of the test piece in an oven kept at 100° C. for 400 hours.

Weld line was evaluated on the basis of the length of the line generated at the location close to the cut off part opposite to the gate when a flat plate having a cut off part as shown in the drawing is molded by injection molding at 280° C. The flat plate is a square having a side of 150 mm and a thickness of 2 mm. The plate has a rectangular cut off part having a size of 40 mm × 30 mm apart from one side by 25 mm. Gate 1 is located at a position close to cut off part and 10 mm apart from the side.

Weld line 2 appears in a linear shape approximately at the center part close the cut off part opposite to the gate.

Gate is a 1 mm$\phi$ pin gate.

Each small letter represents the length as follows:

a=25 mm, b=30 mm, c=10 mm and d=40 mm.

EXAMPLE 1

A 10 l autoclave having a jacket and a stirrer was washed and dried. After the air in the autoclave was replaced with nitrogen, 1 kg of butadiene preliminarily purified and dried and 4 kg of n-hexane were charged thereinto. To this mixture were added a 15 weight % solution of n-butyl lithium in hexane by 0.85 g as n-butyl lithium and tetrahydrofuran as a vinylating agent by twice the lithium in mole ratio. The polymerization was carried out for 3 hours throughout controlling the temperature at 70° C. Carbon tetrachloride as a coupling agent was added to the polymer solution obtained by 1/5 of lithium in mole ratio and the reaction was allowed to proceed for 30 minutes. To the polymer solution was added 12 g of 2,6-di-tert.-butyl-4-methylphenol as a stabilizer. Then the solvent was distilled off and thus there was synthesized polybutadiene having 18.3% of 1,2-vinyl-structure and 34.0% of 1,4-cis-structure (Sample A).

In accordance with the process quite similar to that to prepare Sample A except that hexamethylphosphoramide (HMPA) was added as a vinylating agent by 0.2 of lithium in mole ratio and silicon tetrachloride was used as coupling agent, there was obtained polybutadiene having 29.0% of 1,2-vinyl-structure and 28.5% of 1,4-cis-structure (Sample B).

EXAMPLE 2

Seven weight parts of polybutadiene obtained in Example 1 (Sample A) was uniformly dissolved in 93 weight parts of styrene and 10 weight parts of ethylbenzene. In order to prepare the raw material liquid for polymerization, 1,1-di-tert.-butylperoxy-3,3,5-trimethylcyclohexane was added to the mixture mentioned above by $1 \times 10^{-4}$ mole thereof per mole of styrene. This raw material liquid was continuously sent to a successive three-step-reactor to cause polymerization. The reaction temperature was so controlled that it was 110° C., 130° C. and 155° C. in the first, second and third reaction column, respectively. The residence time of the polymer in whole reaction columns was 10 hours. The polymer discharged from the third reaction column was further sent continuously to a devolatilizing apparatus kept at a temperature of 230° C. and a pressure of 30 mm Hg so that the styrene monomer not altered and the solvent were removed. Thus, the amount of the styrene monomer which was not altered and the solvent was 25 weight % of that of the raw material liquid to be polymerized. Accordingly, the content of polybutadiene in the polystyrene obtained (Sample I) was 8.5 weight %. Using the same amount of Sample B instead of Sample A, a rubber-reinforced polystyrene (Sample II) was obtained in accordance with the quite similar process to that mentioned above.

EXAMPLES 3 AND 4

A mixture comprising 50 weight parts of the rubber-reinforced polystyrene obtained in Example 2 (Sample I or Sample II), 50 weight parts of poly(2,6-dimethyl-1,4-phenylene)ether having a weight average molecular weight of 65,000 and 1 weight part of octadecyl-3-(3,5-di-tert.-butyl-4-hydroxyphenyl)propionate (produced by CHIBA-Geigy Corporation, trade name: "Irganox 1076") was uniformly blended in a blender and pelletized with a 30 mm$\phi$ twin-screw extruder at 280° C. Thin flat rectangular test pieces having a thickness of $\frac{1}{4}$ inch and dumbbell-shaped test pieces having a thickness of $\frac{1}{8}$ inch were molded from these pellets and submitted to tests. The results of physical properties measurement are shown in Table 1.

Comparative Examples 1 and 2

In order to compare the results due to the difference in rubber, a rubber-reinforced polystyrene (Sample III) was obtained in accordance with the quite similar procedure to that in Example 2 using Diene NF 35R (produced by ASAHI KASEI) comprising 14% of 1,2-vinyl-structure, 34% of 1,4-cis-structure and 52% of 1,4-trans-structure.

In the same method was obtained Sample IV using Nippol 1220 (produced by Nippon Zeon) having 98% of 1,4-cis-structure.

Compositions were prepared from Sample III or Sample IV, respectively, in accordance with the similar process to that in Example 3. Physical properties of them were measured and the results are summarized in Table 1.

As seen from Table 1, Sample I and Sample II give impact strength much higher than that of Sample III and as high as that of Sample IV.

However, after the exposure for 400 hours in an oven kept at 100° C., the composition of Sample IV showed a remarkable decrease in impact resistance. Consequently, its inferiority in oxidation resistance is obvious.

Also the compositions of Samples I and II showed weld lines shorter than those of Samples III and IV.

EXAMPLE 5

A resin composition was prepared according to the same procedure as Example 3 using 55 weight parts of rubber-reinforced polystyrene obtained in Example 2 (Sample I), 45 weight parts of copolymer consisting of 90 mol % of 2,6-dimethylphenol and 10 mol % of 2,3,6-trimethyl phenol and having weight average molecular weight of 60,000, and one weight part of "Irganox 1076" as a stabilizer. Properties of the composition are shown in Table 1.

TABLE 1

| Rubber-reinforced polystyrene | Example 3 Sample I | Example 4 Sample II | Comp. example 1 Sample III | Comp. example 2 Sample IV | Example 5 Sample I |
|---|---|---|---|---|---|
| Microstructure of rubber | | | | | |
| 1,2-vinyl-structure | 18.3% | 29.0% | 13.0% | 1.1% | 18.3% |
| 1,4-cis-structure | 34.0% | 28.5% | 35.0% | 98.0% | 34.0% |
| Measured values of physical properties | | | | | |
| Melt-flow rate (g/10 min.) | 3.3 | 3.4 | 3.4 | 3.1 | 4.5 |
| Heat distortion temperature (°C.) | 120 | 120 | 120 | 119 | 119 |
| Gloss | 78 | 79 | 76 | 80 | 79 |
| Izod impact strength (kg · cm/cm) | 12.5 | 11.8 | 6.5 | 13.0 | 14.5 |
| Tensile strength (kg/cm$^2$) | 640 | 645 | 630 | 620 | 645 |
| Weld line (cm) | 2.8 | 3.1 | 3.9 | 4.4 | 2.7 |
| Izod impact strength after exposure at 100° C. for 400 hours | 10.5 (84) | 10.3 (87) | 5.6 (86) | 6.8 (52) | 13.0 (90) |

Note:
The values in parenthesis represent the ratios of the impact strength after exposure to that before exposure (%).

EXAMPLE 6

In accordance with the process quite similar to that to prepare Sample A in Example 1 except that hexamethylphosphoramide (HMPA) was used as a vinylating agent by 0.5 of lithium in mole ratio and silicon tetrachloride was used as a coupling agent, there was obtained poly-butadiene having 39% of 1,2-vinyl-structure (Sample C).

A rubber-reinforced polystyrene (Sample V) was obtained in accordance with the process quite similar to that of Example 2 except that the same amount of Sample C was used instead of Sample A.

The Sample V was combined with poly(2,6-dimethyl-1,4-phenylene)ether to produce a composition; the Izod impact strength thereof was measured and found to be 6.3 kg.cm/cm, a slightly lower value compared with that of Sample III.

EXAMPLE 7

Using 4 weight parts of Sample A obtained in Example 1, 96 weight parts of styrene and 5 weight parts of ethylbenzene, there was obtained a polystyrene having 4.5 weight % of polybutadiene content (Sample VI) in accordance with the process similar to that of Example 2.

The Sample VI was combined with poly(2,6-dimethyl-1,4-phenylene)ether to produce a composition and the Izod impact strength thereof was measured; however, there was obtained a value as low as 4.7 kg.cm/cm.

We claim:

1. A polyphenylene ether composition which comprises:
   (a) 80–20 weight parts of polyphenylene ether resin, and
   (b) 20–80 weight parts of a rubber-reinforced polystyrene wherein 5–25 weight % of polybutadiene having 18–35% of 1,2-vinyl-structure is dispersed forming discontinuous elastomer phase.

2. The polyphenylene ether composition of claim 1 wherein the polyphenylene ether resin is a polymer having the following recurring unit I or units I and II:

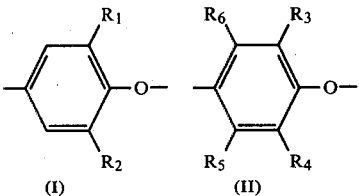

wherein $R_1$–$R_6$ represent the same or different monovalent residual group such as alkyl group having 1–4 carbon atoms excluding tert.-butyl group, aryl group, halogen or hydrogen but $R_5$ and $R_6$ are not hydrogens at the same time.

3. The composition of claim 2 wherein the polyphenylene ether resin is poly(2,6-dimethyl-1,4-phenylene)ether.

4. The composition of claim 1 wherein the polyphenylene ether resin is a styrene-grafted-poly(2,6-dimethyl-1,4-phenylene)ether.

5. The composition of claim 1 wherein the polyphenylene ether resin is a copolymer of 2,6-dimethyl phenol and 2,3,6-trimethyl phenol.

6. The composition of claim 1 wherein the polyphenylene ether resin is a styrene-grafted copolymer of 2,6-dimethyl phenol and 2,3,6-trimethyl phenol.

* * * * *